(12) United States Patent
Koyanagi et al.

(10) Patent No.: US 8,648,120 B2
(45) Date of Patent: Feb. 11, 2014

(54) LIQUID RHEOLOGY MODIFIER

(75) Inventors: Koji Koyanagi, Wakayama (JP); Hotaka Yamamuro, Wakayama (JP); Toshiharu Kojima, Wakayama (JP)

(73) Assignee: Kao Corporation, Tokyo (JP)

( * ) Notice: Subject to any disclaimer, the term of this patent is extended or adjusted under 35 U.S.C. 154(b) by 940 days.

(21) Appl. No.: 11/896,760

(22) Filed: Sep. 5, 2007

(65) Prior Publication Data

US 2008/0078814 A1    Apr. 3, 2008

(30) Foreign Application Priority Data

Sep. 6, 2006 (JP) ................................. 2006-241344
Apr. 9, 2007 (JP) ................................. 2007-101577

(51) Int. Cl.
*C09K 3/00* (2006.01)
*B01J 13/00* (2006.01)
*C04B 7/00* (2006.01)

(52) U.S. Cl.
USPC .......... 516/102; 507/240; 106/822; 106/823; 106/819; 106/778; 106/782; 106/732; 106/726; 106/727; 106/608; 106/624; 106/715; 106/708; 106/639

(58) Field of Classification Search
USPC .......... 516/102; 106/639, 822, 823, 819, 778, 106/782, 732, 726, 727, 608, 624, 715, 714, 106/708
See application file for complete search history.

(56) References Cited

U.S. PATENT DOCUMENTS

| | | | | |
|---|---|---|---|---|
| 5,672,578 | A * | 9/1997 | Carrie et al. | 510/245 |
| 6,239,183 | B1 * | 5/2001 | Farmer et al. | 516/102 |
| 7,374,699 | B2 * | 5/2008 | Yamamuro et al. | 516/102 |
| 7,846,876 | B2 * | 12/2010 | Koyanagi et al. | 507/129 |
| 2003/0200901 | A1 * | 10/2003 | Yamamuro et al. | 106/724 |
| 2006/0041028 | A1 * | 2/2006 | Crews | 516/135 |
| 2008/0058227 | A1 * | 3/2008 | Koyanagi et al. | 507/129 |
| 2008/0262129 | A1 * | 10/2008 | Yamamuro et al. | 524/2 |
| 2008/0300341 | A1 * | 12/2008 | Yamamuro et al. | 523/177 |

FOREIGN PATENT DOCUMENTS

| | | |
|---|---|---|
| EP | 1226875 A2 | 12/2002 |
| JP | 2003-313536 A | 11/2003 |
| JP | 2004189978 A | 7/2004 |
| JP | 2005-35686 A | 2/2005 |
| JP | 2005-133075 A | 5/2005 |
| JP | 2007-99561 A | 4/2007 |
| WO | WO 01/18147 A1 * | 3/2001 |
| WO | WO 2005/035686 A1 * | 4/2005 |

OTHER PUBLICATIONS

Derwent Abstract on East, week 200969, London: Derwent Publications Ltd., AN 2003-114042, Class L02, JP 2003313536 A & EP 1 266 875 A2 (Kao Corp.), abstract.*
Derwent Abstract on East, week 200909, London: Derwent Publications Ltd., AN 2004-503145, Class E14, JP 2004189978 A, (Kao Corp), abstract.*
Derwent Abstract on East, week 200957, London: Derwent Publications Ltd., AN 2005-346211, Class A97, EP 1693352 A1, (Kao Corp), abstract.*
Machine Translation of Publ. No. JP 2004189978 A, published Jul. 8, 2004, Japan patent Office, Tokyo, Japan (Downloaded Jun. 13, 2010).*
Chinese Office Action with the English translation dated Aug. 30, 2011, for Application No. 200710147287.0.
Japanese Office Action with the English translation dated Oct. 23, 2012, for Application No. 2007-230199.
Chinese Office Action dated, Jan. 6, 2012, for Chinese Application No. 200710147287.0.

* cited by examiner

*Primary Examiner* — Daniel S Metzmaier
(74) *Attorney, Agent, or Firm* — Birch, Stewart, Kolasch & Birch, LLP

(57) ABSTRACT

The present invention provides a liquid rheology modifier containing compounds (A) and (B) selected from combination (1) of compound (A) selected from cationic surfactants and compound (B) selected from anionic aromatic compounds and combination (2) of compound (A) from cationic surfactants and compound (B) selected from brominated compounds; and dicarboxylic acid (C).

11 Claims, No Drawings

LIQUID RHEOLOGY MODIFIER

FIELD OF THE INVENTION

The present invention relates to a liquid rheology modifier.

BACKGROUND OF THE INVENTION

For regulating the rheological physical properties (for example, viscosity) of slurry of water and powder, there have been used techniques that involve regulating the ratio of water to powder or changing a dispersed state of particles with a pH regulating agent, or controlling the amount of excess water by adding a water-absorbing polymer, or techniques that involve adding a water-soluble polymer compound to a slurry system to utilize a thickening action attributable to entanglement of polymer molecules.

A slurry rheology modifier of combination of compounds (A) and (B), wherein the combination is selected from combination (1) wherein the compound (A) is selected from cationic surfactants and the compound (B) is selected from anionic aromatic compounds and combination (2) wherein the compound (A) is selected from cationic surfactants and the compound (B) is selected from brominated compounds has been developed for the purpose of obtaining slurry showing sufficient viscosity upon kneading for a short time in producing slurry, having stable resistance to material separation, exhibiting stable properties and composition even in the case of a high water/powder ratio or in contact with an aqueous phase, and being aimed at obtaining slurry excellent in hardening physical properties without delaying coagulation of hydraulic powder (JP-A 2003-313536 or the corresponding EP-A 1266875). A rheology modifier kit using combination of these compounds has been developed (JP-A 2004-189978).

WO-A 2005/035686 or the corresponding EP-A 1693352 discloses a surfactant composition containing two kinds of surfactants and a cationic polymer.

SUMMARY OF THE INVENTION

The present invention relates to a liquid rheology modifier containing a first water-soluble low-molecular-weight compound (referred to hereinafter as compound (A)), a second water-soluble low-molecular-weight compound different from the compound (A) (referred to hereinafter as compound (B)), and a dicarboxylic acid (C), combination of compounds (A) and (B) being selected from combination (1) wherein the compound (A) is selected from cationic surfactants and the compound (B) is selected from anionic aromatic compounds and combination (2) wherein the compound (A) is selected from cationic surfactants and the compound (B) is selected from brominated compounds.

Also, the present invention relates to a liquid rheology modifier containing a first water-soluble low-molecular-weight compound (referred to hereinafter as compound (A)), a second water-soluble low-molecular-weight compound different from the compound (A) (referred to hereinafter as compound (B)), and a hydrophilic group- and hydrophobic group-containing amphipathic compound (I)) being different from the compounds (A) and (B), wherein:

the viscosity of the modifier at 20° C. is 5000 mPa·s or less,
combination of compounds (A) and (B) is selected from combination (1) wherein the compound (A) is selected from cationic surfactants and the compound (B) is selected from anionic aromatic compounds and combination (2) wherein the compound (A) is selected from cationic surfactants and the compound (B) is selected from brominated compounds.

a reversed rotating of air bubbles being observed in a solution when stirring is stopped in the following standard test (I):

Standard test (I): 90 mL of 0.1 N aqueous potassium hydroxide solution and 10 ml of the rheology modifier are added to a 200-mL beaker and stirred at 4 rotation/second with a glass rod of 6 mm in diameter for 180 seconds.

Further, the present invention relates to a liquid rheology modifier containing a first water-soluble low-molecular-weight compound (referred to hereinafter as compound (A)), a second water-soluble low-molecular-weight compound different from the compound (A) (referred to hereinafter as compound (B)), and a dicarboxylic acid (C), combination of compounds (A) and (B) being selected from combination (1) wherein the compound (A) is selected from cationic surfactants and the compound (B) is selected from anionic aromatic compounds and combination (2) wherein the compound (A) is selected from cationic surfactants and the compound (B) is selected from brominated compounds, the viscosity of the liquid rheology modifier at 20° C. being 5000 mPa·s or less, the viscosity of the slurry being 3000 mPa·s or more at 20° C. just after 16 g of the liquid rheology modifier is added to and mixed with a slurry prepared from 400 g of normal portland cement and 400 g water, Further, the present invention relates to a slurry containing powder, water and the above shown liquid rheology modifier or a slurry containing a hydraulic powder, water and the above shown liquid rheology modifier. The invention provides use of the above shown liquid rheology modifier as a slurry rheology modifier.

DETAILED DESCRIPTION OF THE INVENTION

However, these rheology modifiers are those exhibiting rheological modification effect by mixing the two compounds with slurry just before use, and a liquid rheology modifier of one-pack type is not referred to. A liquid rheology modifier of one-pack type is desirable from the viewpoint of operativeness such as batching and compounding operation; however, when an aqueous solution merely containing the two compounds described in the above-mentioned literatures is prepared, the aqueous solution shows significant thickening and cannot be made excellent in handling ability. It is considered that the viscosity of such thickened aqueous solution is decreased by another component, but a rheology modifier capable of sufficient re-thickening in use with improved handling ability has never been found.

The present invention provides a liquid rheology modifier of one-pack type, which has viscosity suitable for handling, and when added to slurry or the like, can maintain modification effects such as thickening effect.

According to the present invention, there is provided a liquid rheology modifier of one-pack type to improve operativeness such as batching, compounding operation etc.

The viscosity of the rheology modifier of the present invention is a modifier which has low viscosity despite one-pack form, and which upon addition of the rheology modifier to water or slurry such as addition to an aqueous solution, increases the viscosity of the rheology modifier- and water-containing solvent.

The first water-soluble low-molecular-weight compound (hereinafter referred to as "compound (A)") used in the rheology modifier of the present invention, the second water-soluble low-molecular-weight compound different from the compound (A) (hereinafter referred to as "compound (B)")

form an aggregate structure such as string-shaped micelle in a composition as the object of rheological modification, to exhibit a rheological modification effect by formation of the structure.

A first aspect of the rheology modifier of the present invention contains the compound (A), the compound (B) and the dicarboxylic acid (C).

It is estimated that the dicarboxylic acid (C) used in the rheology modifier of the present invention, when placed in a solution containing the compounds (A) and (B) at high concentration with less water, enters a formed structure of the compounds (A) and (B) and prevents the compounds (A) and (B) from increasing the viscosity, and consequently the rheology modifier before dilution has low viscosity. It is estimated that upon dilution with a water-containing solution (aqueous solution), the dicarboxylic acid (C) transfers from the aggregate structure of the compounds (A) and (B) to the aqueous solvent, and consequently the rheology modifier after dilution brings about high viscosity by the formed structure of the compounds (A) and (B).

It is not known why the rheology modifier of the first aspect of the invention changes the viscosity manifestation by dilution with an aqueous solvent or not. It is estimated that distribution of the dicarboxylic acid (C) between water and the aggregate structure is attributable. Since the dicarboxylic acid (C) has 2 carboxyl groups, the dicarboxylic acid (C) inhibits the structure from forming when it enters into the aggregate structure. It is easily dissolved in water when it is diluted.

In a diluted aqueous solution, the compounds (A) and (B) preferably form an aggregate structure and the aggregate structure is preferably a string-shaped micelle. The presence of the aggregate structure can be confirmed by flow birefringence with a polarizing plate or by dynamic viscoelasticity measurement or the like.

In JP-A 2003-313536 and JP-A 2004-189978, a string-shaped micelle is considered to be formed, but in combination of the anionic compound and the cationic compound used therein, there cannot be found techniques in which modification effects such as re-thickening effect in use can be maintained while handling ability is improved. Both reduction in the viscosity of the composition (aqueous solution etc.) containing the 2 compounds and maintenance of performance in use can be achieved by using the dicarboxylic acid in the first aspect of the invention. Further, when the pH is high, dissolution of the dicarboxylic acid can be promoted to achieve higher viscoelasticity. The resulting rheology modifier is not a hazardous material (hazardous material stipulated under the Fire Defense Law), and from this viewpoint too, the hydrophilic and high-boiling dicarboxylic acid is preferably used. That is, the present invention can, without using an organic solvent, reduce the viscosity of the composition of one-pack type, secure low-temperature stability and maintain performance, and achieve conversion into non-hazardous material.

The combination of the compound (A) and the compound (B) may be any combination that forms an aggregate structure such as string-shaped micelle, and preferably has a property that when an aqueous solution of compound (A) having a viscosity of 100 mPa·s or less is mixed with an aqueous solution of compound (B) having a viscosity of 100 mPa·s or less, the viscosity of the resulting mixture can be made at least twice as high as the viscosity of either aqueous solution before mixing. The combination has a property that the viscosity can be made more preferably at least 5 times, even more preferably at least 10 times, further more preferably at least 100 times and even more preferably at least 500 times. The viscosity refers to viscosity determined by a Brookfield viscometer under the condition of 20° C. (with Rotor C [or Rotor No. 3 when expressed in number] at 1.5 rpm to 12 rpm).

In this case, the viscosity behavior may be exhibited by any number of revolutions of 1.5 rpm to 12 rpm. The aqueous solutions of compounds (A) and (B) are mixed in the 50/50 ratio by weight. Both the concentration of compound (A) in aqueous solution and the concentration of compound (B) in aqueous solution are preferably 0.01 to 50% by weight.

As used herein, the water-soluble low-molecular-weight compound is a compound which in water at room temperature, does not cause phase separation from water in a monomolecular state or in a state of having formed a structure such as an aggregate, a micelle or a liquid crystal, or in a mixed state thereof. The phase refers to a region having macroscopic dimensions with clearly defined statistical physical quantities in temperature, pressure etc. ("Colloid Kagaku" (Colloid Chemistry), Vol. 1, $1^{st}$ Edition, pp. 89-90, published on Oct. 12, 1995, tokyo Kagaku Dolin). The water-soluble low-molecular-weight compound may preferably have a water-solubility of 0.001 mg or larger at 25° C. in 100 g of water and a molecular weight of 2,000 or less.

The compound selected from cationic surfactants is preferably a cationic surfactant in the form of a quaternary salt, and the cationic surfactant in the form of a quaternary salt preferably has, in its structure, at least one saturated or unsaturated linear or branched alkyl group having 10 to 26 carbon atoms. Examples include (C10 to C26) trimethyl ammonium salt, an alkyl (C10 to C26) pyridinium salt, an alkyl (C10 to C26) imidazolinium salt, and an alkyl (C10 to C26) dimethylbenzyl ammonium salt, and specific examples include hexadecyltrimethyl ammonium chloride, hexadecyltrimethyl ammonium bromide, octadecyltrimethyl ammonium chloride, octadecyltrimethyl ammonium bromide, tallow trimethyl ammonium chloride, tallow trimethyl ammonium bromide, hydrogenated tallow trimethyl ammonium chloride, hydrogenated tallow trimethyl ammonium bromide, hexadecylethyldimethyl ammonium chloride, octadecylethyldimethyl ammonium chloride, hexadecylpropyldimethyl ammonium chloride, hexadecyl pyridinium chloride, 1,1-dimethyl-2-hexadecyl imidazolinium chloride, hexadecyldimethyl benzyl ammonium chloride etc., and two or more of these compounds may be simultaneously used. From the viewpoint of water solubility and thickening effect, specifically hexadecyltrimethyl ammonium chloride, octadecyltrimethyl ammonium chloride, hexadecyl pyridinium chloride etc. are preferable. From the viewpoint of the temperature stability of the thickening effect, two or more kinds of cationic surfactants different in the number of carbon atoms in the alkyl group are preferably used as the compound (A).

Particularly, when the rheology modifier of the present invention is applied to concrete etc., a quaternary ammonium salt not containing a halogen such as chlorine is preferably used from the viewpoint of preventing salt corrosion of reinforcing steel and deterioration of concrete.

The quaternary ammonium salt not containing a halogen such as chlorine includes ammonium salts, imidazolium salts etc., and specific examples include hexadecyltrimethyl ammonium methosulfate, hexadecyldimethylethyl ammonium ethosulfate, octadecyltrimethyl ammonium methosulfate, octadecyldimethylethyl ammonium ethosulfate, tallow trimethyl ammonium methosulfate, tallow dimethylethyl ammonium ethosulfate, 1,1-dimethyl-2-hexadecyl imidazolinium methosulfate, hexadecyldimethylhydroxyethyl ammonium acetate, octadecyldimethylhydroxyethyl ammonium acetate, hexadecyldimethylhydroxyethyl ammonium propionate, octadecyldimethylhydroxyethyl ammonium propionate, tallow dimethylhydroxyethyl ammonium acetate, tallow dimethylhydroxyethyl ammonium propionate, etc.

The quaternary ammonium salt not containing a halogen such as chlorine can be obtained for example by quaternarizing a tertiary amine with dimethyl sulfate or diethyl sulfate.

The compound selected from anionic aromatic compounds includes a carboxylic acid having an aromatic ring and salts thereof, phosphonic acid and salts thereof, and sulfonic acid and salts thereof, and specific examples include salicylic acid, p-toluenesulfonic acid, sulfosalicylic acid, benzoic acid, m-sulfobenzoic acid, p-sulfobenzoic acid, 4-sulfophthalic acid, 5-sulfoisophthalic acid, p-phenolsulfonic acid, m-xylene-4-sulfonic acid, cumenesulfonic acid, methylsalicylic acid, styrenesulfonic acid and chlorobenzoic acid, and these may have formed salts, and these may be used as a mixture of two or more thereof. When the anionic aromatic compound is a polymer, its weight-average molecular weight (for example, polyethylene oxide-equivalent molecular weight by gel permeation chromatography) is preferably less than 500.

The compound selected from brominated compounds is preferably an inorganic salt, and includes sodium bromide, potassium bromide, hydrogen bromide etc.

In the present invention, the compound (A) and the compound (B) are preferably those easily forming an aggregate because each of them has low viscosity even in concentrated aqueous solution, exhibits excellent rheological modification effect even at a low effective concentration of the rheology modifier in an aqueous phase, and is excellent in operativeness at the time of compounding because each of them has low viscosity even in concentrated aqueous solution. In the present invention, the slurry modifier can achieve thickening when added at a very low effective concentration of 10% by weight or less. It can achieve the same effect even in a slurry system having a high ionic strength. It can, depending on slurry systems, exhibit rheological characteristic, not achievable with conventional thickeners, that is, a very stable resistance to material separation, particularly upon contacting with an aqueous phase. This is useful particularly for slurry containing hydraulic powder.

A combination wherein the compound (A) is an alkyl (C10 to C26) trimethyl ammonium salt and the compound (B) is a sulfonate having an aromatic ring is even more preferably. The combination exhibits its effect even is the effective concentration in an aqueous phase of slurry is 5% by weight or less. Particularly, the compound (B) when used in slurry of hydraulic powder is preferably toluenesulfonic acid, xylenesulfonic acid, cumenesulfonic acid, styrenesulfonic acid or a salt thereof, more preferably p-toluenesulfonic acid or a salt thereof, from the viewpoint of avoiding curing retardation.

The dicarboxylic acid (C) is preferably a C3 to C10 dicarboxylic acid wherein the number of carbon atoms between 2 carboxyl groups in preferably 0 to 8. The dicarboxylic acid is specifically at least one compound selected from 2,4-diethylglutaric acid, pimelic acid, azelaic acid, 4-methylcyclohexane-1,2-dicarboxylic acid, 4-methylcylcohexene-1,2-dicarboxylic acid, malonic acid, glutaric acid, 1,4-cyclohexanedicarboxylic acid, 1,2-cyclohexanedicarboxylic acid, norbornenedicarboxylic acid, maleic acid, itaconic acid, citraconic acid, cylcohexene-1,2-dicarboxylic acid, 2,2-dimethylglutaric acid, 3,3-dimethylglutaric acid, and 3-methyladipic acid. The dicarboxylic acid (C) is more preferably at least one compound selected from 2,4-diethylglutaric acid, pimelic acid, azelaic acid, glutaric acid, 4-methylcyclohexane-1,2-dicarboxylic acid, 4-methylcyclohexene-1,2-dicarboxylic acid, dimethylglutaric acid and 3-methyladipic acid from the viewpoint of the content and precipitation in the rheology modifier, even more preferably 2,4-diethylglutaric acid, azelaic acid, glutaric acid, 4-methylcyclohexane-1,2-dicarboxylic acid, 2,2-dimethylglutaric acid, 3,3-dimethyl-glutaric acid or 3-methyladipic acid from the viewpoint of effective reduction of viscosity with a smaller amount of the dicarboxylic acid added. These dicarboxylic acids may also be used in the form of anhydrides.

The rheology modifier of the present invention preferably contains a monocarboxylic acid (E). The rheology modifier containing the monocarboxylic acid rapidly confers viscosity, particularly viscosity at low temperatures, on an aqueous solution or slurry upon dilution. The rheology modifier containing the monocarboxylic acid is considered to transfer, with time lag, from the aggregate structure to the aqueous solvent due to the difference in hydrophilicity between the dicarboxylic acid and monocarboxylic acid, thereby realizing high viscosity more uniformly and rapidly.

The number of carbon atoms in the monocarboxylic acid (E) is preferably 1 to 26, more preferably 6 to 18 from the viewpoint of exhibiting higher slurry viscosity, even more preferably 6 to 12 from the viewpoint of product stability. The monocarboxylic acid is preferably linear and saturated. The monocarboxylic acid is specifically at least one compound selected from (E1) linear saturated monocarboxylic acids such as acetic acid, propionic acid, butyric acid, valeric acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, eicosanoic acid, hencosanoic acid, behenic acid, tricosanoic acid, tetracosanoic acid, pentacosanoic acid, and cerotic acid, (E2) linear unsaturated monocarboxylic acids such as undecenoic acid, linolenic acid, linolic acid, oleic acid, and elaidic acid, (E3) branched saturated monocarboxylic acids such as isovaleric acid, 2-ethylhexanoic acid, 3,5,5-trimethylhexanoic acid, isopalmitic acid, and isostearic acid, (E4) branched unsaturated monocarboxylic acids, (E5) bile acid such as cholic acid, deoxycholic acid, chenodeoxycholic acid, and lithocholic acid, phenoxyacetic acid and mandelic acid. Among these, the compound group mentioned in (E1) is more preferable, and hexanoic acid, heptanoic acid, octanoic acid, nonanoic acid, decanoic acid, undecanoic acid, and lauric acid are even more preferable. These monocarboxylic acids can also be used as partially neutralized salts.

The content of the monocarboxylic acid (E) is preferably 0.7 to 70 parts by weight, more preferably 2 to 30 parts by weight, even more preferably 3 to 20 parts by weight, based on 100 parts by weight of the compound (A).

The rheology modifier of the present invention is preferably the one by which a reversed rotating is observed when stirring is stopped in the following standard test (I). Further, the rheology modifier of the present invention is preferably the one by which a reversed rotating is observed when stirring is stopped in the following standard test (II). Further, the rheology modifier of the present invention is preferably the one by which a reversed rotating is observed when stirring is stopped in both of the following standard tests (I) and (II).

By the term "reversed rotating" it is meant that aggregates in a solution become entwined with one another to confer elastic property on the solution, and reversed rotating refers to the state of air bubbles that after incorporation into a solution, move in a direction opposite to the rotation direction when stirring is stopped. From the fact that reversed rotating is generated, it can be estimated that an aggregate structure such as string-shaped micelle is formed by the compound (A) and the compound (B) in a mixed solution of an aqueous potassium hydroxide solution and the rheology modifier.

Standard test (I): 90 mL of 0.1 N aqueous potassium hydroxide solution and 10 ml of the rheology modifier are added to a 200-mL beaker and stirred at 4 rotation/second with a glass rod of 6 mm in diameter for 180 seconds.

Standard test (II): 95 mL of 0.1 N aqueous potassium hydroxide solution and 5 ml of the rheology modifier are added to a 200-mL beaker and stirred at 4 rotation/second with a glass rod of 6 mm in diameter for 180 seconds.

In both of the above-mentioned standard tests (I) and (II), for stirring, the glass rod is introduced to the bottom and stirred along a wall surface. When the movement of air bubbles in a direction opposite to the rotation direction is observed by visual examination after stirring is stopped, it is judged that the reversed rotating of air bubbles occurs.

A second aspect of the liquid rheology modifier of the present invention is a liquid rheology modifier having 5000 mPa·s or less at 20° C. containing the compound (A), the compound (B), and the compound (D) different from the compounds (A) and (B), wherein the reversed rotating of air bubbles is observed in a solution when stirring is stopped in the standard test (I). The standard test(I) of reversed rotating is the same as in the first aspect.

The compounds (A) and (B) used in the second aspect of the rheology modifier of the present invention can be the same as in the first aspect.

By incorporating the compound (D), preferably in an amount of 0.1 to 30% by weight, into the modifier containing the compounds (A) and (B), the modifier can realize a viscosity of 5000 mPs·s or less at 20° C. Usually, the compounds (A) and (B) in the present invention to which water was added cannot realize such viscosity. Accordingly, water does not correspond to the compound (D). The compound (D) is preferably a compound to be dissolved in a mixed solution of the compounds (A) and (B). The compound (D) is an amphipathic compound having hydrophilic and hydrophobic groups and is preferably a compound having ionic functional groups. The ionic functional groups include groups capable of forming salt- or acid-type groups such as a carboxyl group of carboxylic acid and an amino group of amine. Such compounds include carboxylic acid-type compounds such as dicarboxylic acid, tricarboxylic acid and tetracarboxylic acid, sulfonic acid-type compounds, etc., and specific examples include not only the compounds mentioned as the dicarboxylic acid (C) but also tridicarboxylic acids such as hexane-1, 3,6-tricarboxylic acid and dicarboxylic acid esters such as adipic acid monoester. From the viewpoint of the viscosity of the rheology modifier, the molecular weight of the compound (D) is preferably 1000 or less, more preferably 500 or less. From the viewpoint of the storage stability of the rheology modifier and compounding operation, the compound (D) is preferably a compound to be dissolved in an aqueous solution containing the compounds (A) and (B). From the viewpoint of the rheological modification effect thereof when added to an object of rheological modification, the compound (D) is preferably a compound to be dissolved in water at the pH of an a object of rheological modification.

A second aspect of the rheology modifier of the present invention is characterized in that just after, preferably within 60 seconds after, 16 g of the liquid rheology modifier is added to and mixed with slurry prepared from 400 g normal portland cement and 400 g water, the viscosity of the slurry at 20° C., is 3000 mPa·s or more, more preferably 3500 mPa·s or more, even more preferably 4000 mPa·s or more.

A third aspect of the rheology modifier of the present invention is a liquid rheology modifier containing the compound (A), the compound (B) and the dicarboxylic acid (C) and having a viscosity at 20'C of 3000 mPa·s or less, preferably 3000 mPa·s or less, more preferably 2000 mPa·s or less, characterized in that just after, preferably within 60 seconds after, 16 g of the liquid rheology modifier is added to and mixed with slurry prepared from 400 g normal portland cement and 400 g water, the viscosity of the slurry at 20° C. is 3000 mPa·s or more, more preferably 3500 mPa·s or more, even more preferably 4000 mPa·s or more.

The compound (A), the compound (B) and the dicarboxylic acid (C) used in the third aspect of the rheology modifier of the present invention can be the same compounds as in the first aspect.

In the third aspect of the rheology modifier of the present invention, a monocarboxylic acid (E) is preferably contained. The monocarboxylic acid (E) used can be the same compound as in the first aspect.

In the third aspect of the rheology modifier of the present invention, it is preferable that reversed rotating is observed in a solution when stirring is stopped in standard test (I) and/or (II). The standard tests (I) and (II) of a reversed rotating is the same test method as in the first aspect.

In any of the aspects, the rheology modifier of the present invention may contain other components, for example, a dispersant, an AE agent, a retardant, a rapid strength agent, an accelerator, a bubbling agent, a foaming agent, a defoaming agent, a rust preventive, a coloring agent, a fungicide, a cracking reducing agent, a swelling agent, a dye, a pigment etc. insofar as the performance of the present modifier is not hindered.

In the rheology modifier of the present invention, the molar ratio of the compound (A) to the compound (B) (molar ratio of the effective component) is varied for a higher thickening effect depending on the combination of the compounds (A) and (B) and may be suitably determined depending on the intended degree of thickening, and from the viewpoint of the obtained viscosity and aggregate shape, the compound (A)/compound (B)=1/20 to 20/1, preferably 1/20 to 4/1, more preferably 1/3 to 2/1, even more preferably 1/1 to 2/3.

A concentration of the compound (A) in the rheology modifier is preferably less than a concentration at which precipitates appear. From the viewpoint of lowering the viscosity of the rheology modifier, the concentration of the compound (A) in the rheology modifier is preferably 2.5 to 40% by weight, more preferably 5 to 30% by weight, more preferably 10 to 20% by weight.

A concentration of the compound (B) in the rheology modifier is preferably less than a concentration at which precipitates appear. From the viewpoint of lowering the viscosity of the rheology modifier, a concentration of the compound (B) in the rheology modifier is preferably 1.5 to 30% by weight, more preferably 3 to 20% by weight, more preferably 5 to 15% by weight.

The dicarboxylic acid (C) or the compound (D) is contained in the rheology modifier at a concentration lower than the concentration causing precipitation, and from the viewpoint of reducing the viscosity of the rheology modifier, the content of the dicarboxylic acid (C) or the compound (D) in the rheology modifier is preferably 0.1 to 30% by weight, more preferably 0.3 to 15% by weight, even more preferably 0.5 to 10% by weight.

The monocarboxylic acid (E) may be contained in the rheology modifier at a concentration lower than that causing precipitation. From the viewpoint of the rheological modification effect brought out for a short time, the content of the monocarboxylic acid (E) in the rheology modifier is preferably 0.1 to 5% by weight, more preferably 0.3 to 3% by weight, even more preferably 0.5 to 2% by weight.

The weight ratio of the dicarboxylic acid (C) to the total amount of the compound (A) and the compound (B) in the rheology modifier of the present invention, that is, (C)/[(A)+

(B)], is preferably 0.1/100 to 120/100, more preferably 1/100 to 80/100, even more preferably 4/100 to 60/100. When the monocarboxylic acid (E) is contained, the weight ratio of the dicarboxylic acid (C) to the monocarboxylic acid (E), that is, (C)/(E), is preferably 100/100 to 100/1, more preferably 100/70 to 100/10, even more preferably 100/50 to 100/5.

The weight ratio of the compound (D) to the total amount of the compound (A) and the compound (B) in the rheology modifier of the present invention, that is, (D)/[(A)+(B)], is preferably 0.1/100 to 120/100, more preferably 1/100 to 80/100, even more preferably 4/100 to 60/100.

The rheology modifier of the present invention is liquid and is preferably an aqueous solution. From the viewpoint of being liquid, the content of water in the rheology modifier is preferably 50% by weight or more, more preferably 50 to 80% by weight or more, even more preferably 60 to 70% by weight. The total content of the compound (A), the compound (B) and the dicarboxylic acid (C) or the compound (D) in the rheology modifier is preferably 50% by weight or less, more preferably 50 to 20% by weight, even more preferably 40 to 25% by weight. From the viewpoint of their uniform amounts added to an object of rheological modification, any of the compound (A), the compound (B), the dicarboxylic acid (C) and the compound (D) are preferably not precipitated in the rheology modifier. When the monocarboxylic acid (E) is contained, any of the compound (A), the compound (B), the dicarboxylic acid (C) and the monocarboxylic acid (E) are preferably not precipitated in the rheology modifier.

In the rheology modifier of the present invention, the pH of the slurry is preferably 7 or more at any temperatures at least in the range of from 0° C. to 60° C., from the viewpoint of accelerating the diffusion of the dicarboxylic acid (C) or the compound (D) and attaining higher viscoelasticity.

From the viewpoint of operativeness, the viscosity of the rheology modifier of the present invention at 20° C. is preferably 10000 mPa·s or less, more preferably 5000 mPa·s or less, even more preferably 3000 mPa·s or less, further more preferably 2000 mPa·s or less. Particularly, the viscosity at 20° C. of the rheology modifier in the second aspect of the present invention is preferably 5000 mPa·s or less, more preferably 3000 mPa·s or less, even more preferably 2000 mPa·s or less. When the rheology modifier in the first aspect of the present invention has a viscosity at 20° C. of 5000 mPa·s or less, particularly 3000 mPa·s or less, especially 2000 mPa·s or less, 16 g of the above rheology modifier added to and mixed with slurry prepared from 400 g normal portland cement and 400 g water endows the slurry with a viscosity at 20° C. of 3000 mPa·s or more, preferably 3500 mPa·s or more, more preferably 4000 mPa·s or more, just after, preferably within 60 seconds after, the liquid modifier is mixed with the slurry.

Because the rheology modifier of the present invention can endow slurry even having a high ionic strength with excellent rheologic properties, the rheology modifier is preferably used in a slurry the aqueous phase of which has an electric conductivity which is in the range of 0.01 to 80 mS/cm, more preferably 0.1 to 60 mS/cm, even more preferably 1 to 40 mS/cm. Particularly, application thereof to slurry having high electric conductance in an aqueous phase containing a hydraulic composition such as cement etc. is preferable.

According to the present invention, there can be obtained slurry containing the rheology modifier of the present invention, particularly slurry containing the rheology modifier of the preset invention, hydraulic powder, and water.

The rheology modifier of the present invention can be applied preferably to slurry having a water powder ratio of 30 to 600%, more preferably to slurry having a water powder ratio of 30 to 300%. As powder for production of this slurry, it is possible to use hydraulic powder having physical properties by which it is hardened by hydration reaction. Examples include cement and gypsum. Fillers can also be used, and examples of such fillers include calcium carbonate, fly ash, blast-furnace slag, silica fume, bentonite, and clay (natural mineral based on hydrated aluminum silicate; kaolinite, hallosite etc.). These powders may be used alone or as a mixture thereof. If necessary, sand, ballast and a mixture thereof may be added as aggregate to the powder. The rheology modifier can also be applied to slurry of other inorganic oxide-based powder such as titanium oxide or to soil.

In the rheology modifier of the preset invention, the concentration of the active ingredients in slurry may be suitable determined depending on the intended degree of thickening, and the slurry containing the modifier of the present invention can be obtained by a method wherein the rheology modifier of the present invention is added to previously prepared slurry or added at the time of production of slurry. When the active ingredient is selected from combination (1) wherein the compound (A) is selected from cationic surfactants and the compound (B) is selected from anionic aromatic compounds and combination (2) wherein the compound (A) is selected from cationic surfactants and the compound (B) is selected from brominated compounds, the active ingredient is used such that the total content of the compound (A) and the compound (B), in terms of the concentration of the active ingredient in an aqueous phase of slurry, becomes preferably 0.01 to 20% by weight, more preferably 0.1 to 15% by weight, even more preferably 0.1 to 10% by weight, further more preferably 0.3 to 10% by weight.

The viscosity at 20° C. of slurry containing the rheology modifier of the present invention, particularly hydraulic slurry containing hydraulic powder, is preferably 1000 mPa·s or more, more preferably 2000 mPa·s or more, from the viewpoint of rheological modification effect.

Hydraulic slurry containing the rheology modifier of the present invention may contain a dispersant. The dispersant includes water reducing agents such as lignin sulfonate and derivatives thereof, oxycarboxylates, and polyol derivatives, high-performance water reducing agents and high-performance AE water reducing agents such as naphthalene-based agent (Mighty 150 manufactured by Kao Corporation), melamine-based agent (Mighty 150V-2 manufactured by Kao Corporation), polycarboxylic acid-based agents (Mighty 3000 manufactured by Kao Corporation; Rheobuild SP manufactured by NMB; Aquarock FC600, Aquarock FC900 manufactured by Nippon Shokubai Co., Ltd.), and anionic surfactants such as polycarboxylic acid based-surfactants (Poise series manufactured by Kao Corporation). Among these, polycarboxylic acid-based high-performance water reducing agents and polycarboxylic acid-based surfactants are preferably in that both the fluidity and viscosity of the slurry can be satisfied.

Generally, the content of the dispersant in the hydraulic slurry containing the rheology modifier of the present invention, in terms of the active ingredient based on the hydraulic powder, is preferably 0.01 to 5% by weight, more preferably 0.05 to 3% by weight.

When the monocarboxylic acid (E) is further contained in addition to the compound (A), the compound (B), the dicarboxylic acid (C) and the compound (D) of the rheology modifier of the present invention, another known water-soluble polymer can be used in addition to the monocarboxylic acid (E). Another existing water-soluble polymer includes, for example, cellulose derivatives, polyacrylic polymers, polyethylene glycol, polyvinyl alcohol, gum-based polysaccharides, microbial fermentation polysaccharides, cationic polymers etc.

The cationic polymers is preferably the one including a cationic nitrogen, more preferably the one in which a group selected from a C1 to C22 alkyl group, a polyoxyalkylene group including a C2 to C8 oxyalkylene group, hydrogen atom and an acryloyloxyalkylene group is connected to the cationic nitrogen of the cationic polymer. Examples of the cationic polymer are polyallyltrialkylammonium salt such as polyallyltrimethylammonium salt, poly(diallyldimethylammonium salt), poly(methacryloyloxyethyldimethylethylammonium salt), polymethacryl amide propyltrimethyl ammonium salt, a cationic modified starch, a cationic cellulose, a cationic hydroxyethyl cellulose or the like. Among them, a cationic polymer selected from poly(diallyldimethylammonium salt), polymethacryloyl oxyethyldimethylethylammonium salt, polymethacryl amide propyltrimethyl ammonium salt, a copolymer of methacryloyl oxyethyl dimethylethyl ammonium salt and vinylpyrrolidone and a copolymer of methacrylamide propyltrimethyl ammonium salt and vinylpyrrolidone is preferable.

Further, from the viewpoint of the modifying effect of rheology, a counter ion is preferably an alkyl sulfate ion, more preferably ethyl sulfate, methyl sulfate. A molecular weight of the cationic polymer is preferably 1000 or more, more preferably 1000 to 3,000,000. The molecular weight is a weight-average molecular weight measured by gel permeation chromatography in the following conditions:

| Column: | α-M (manufactured by Tosoh Corporation), two columns connected with each other |
| --- | --- |
| eluant: | 0.15 mol/L of Na sulfate, aqueous 1% acetic acid solution |
| Flow rate: | 1.0 mL/min |
| Temperature: | 40° C. |
| Detector: | RI |

As the standard of molecular weight, pullulan is used.

A content of the cationic polymer is preferably 0.1 to 30% by weight, more preferably 1 to 20% by weight in the rheology modifier of the present invention. Further, a weight ratio of the cationic surfactant to the cationic polymer, cationic polymer/cationic surfactant, is preferably 1/100 to 200/100, more preferably 5/100 to 130/100.

The hydraulic slurry containing the rheology modifier of the present invention may contain other ingredients such as an AE agent, a retardant, a rapid strength agent, an accelerator, a bubbling agent, a foaming agent, a defoaming agent, a cracking reducing agent and a swelling agent insofar as the performance of the present agent is not hindered.

A hardened composition obtained by hardening the slurry containing the rheology modifier of the present invention and hydraulic powder is superior in initial hardening physical properties to the counterpart using a water-soluble polymer. A hydraulic composition can be prepared by mixing aggregate with the hydraulic slurry containing the rheology modifier of the present invention. A hardened composition obtained by hardening this hydraulic composition is superior in initial hardening physical properties to the counterpart using a water-soluble polymer and can be used preferably particularly in structures etc.

The aggregate to be mixed with the hydraulic slurry containing the rheology modifier of the present invention is not particularly limited, and fine aggregate or coarse aggregate can be used, and aggregate having high strength with a low percentage of water absorption is preferable. The coarse aggregate includes that of river, land, mountain or sea and lime ballast, crushed stone thereof, blast-furnace slag coarse aggregate, ferronickel slag coarse aggregate, (artificial and natural) lightweight coarse aggregate, and recycled coarse aggregate. The fine aggregate includes that of river, land, mountain or sea and lime sand, silica sand and broken pieces of sand thereof, blast-furnace slag fine aggregate, ferronickel slag fine aggregate, (artificial and natural) lightweight fine aggregate, and recycled fine aggregate.

The slurry containing the liquid rheology modifier of the present invention can contain hydraulic powder, and the slurry containing the rheology modifier is hardened without inhibition of the hydration reaction of the hydraulic powder. Accordingly, the slurry can be applied preferably to civil engineering and building/construction.

EXAMPLES

Hereinafter, the present invention is described in more detail by reference to the Examples. The Examples are merely illustrative of the present invention and not intended to limit the present invention.

Example 1

(1) Preparation of a Rheology Modifier and Measurement of Viscosity and Reversed Rotating A liquid rheology modifier with the composition shown in Table 1 was prepared. The liquid rheology was regulated at 20° C. in a temperature-controlled water bath and measured for its viscosity with a Brookfield viscometer (Rotor No. 3, 12 rpm). Whether reversed rotating occurred or not was observed by the standard test (I) method. The results are shown in Table 2.

The viscosity of 0.8% aqueous sodium p-toluenesulfonate solution at 20° C. [Brookfield viscometer (Rotor No. 3, 12 rpm)] was 100 mPa·s or less, and the viscosity of 1.3% aqueous solution of a hexadecyltrimethyl ammonium chloride/octadecyltrimethyl ammonium chloride mixture (weight ratio 1/1) at 20° C. was 100 mPa·s or less. When these aqueous solutions were mixed in a weight ratio of 50/50, the viscosity of the mixed aqueous solution was 1100 mPa·s.

(2) Evaluation of Rheological Modification of Hydraulic Slurry 400 g normal portland cement was mixed with 400 g water by a hand mixer for 30 seconds, and then 16 g liquid theology modifier in Table 1 (X=3.0 by weight; when X=3.0 and the viscosity is higher than 10000 mPa·s, then X=5.0% by weight; when X=5.0 and the viscosity is higher than 10000 mPa·s, then X=10.0% by weight) was added thereto, and the mixture was further mixed for 60 seconds. The viscosity of the resulting slurry was measured with a viscotester (VT-04E manufactured by RION Co., Ltd.). The temperature of the materials was regulated such that the slurry temperature became 20'C. The results are shown in Table 2.

TABLE 1

| | Kind | % by weight |
| --- | --- | --- |
| Compound (A) | Hexadecyltrimethyl ammonium chloride/octadecyltrimethyl ammonium chloride = 50/50 (weight ratio) | 14.5 |

TABLE 1-continued

| | Kind | % by weight |
|---|---|---|
| Compound (B) | Sodium p-toluensulfonate | 10.0 |
| Dicarboxylic acid (C) | Compound in Table 2 | X* |
| Other | Water | Balance |
| | Total | 100.0 |

*X is an amount (wt %) shown in Table 2.

(that is, the viscosity did not increase any more) was recorded as reaching time. The viscosity of the slurry after mixed was measured with a viscotester (VT-04E manufactured by RION Co., Ltd.). Even if the increase in viscosity did not reach saturation even through the slurry was mixed under stirring for 60 seconds, mixing under stirring was terminated in 60 seconds. The temperature of the materials was regulated such that the slurry temperature became 10° C. or 20° C. The results are shown in Table 4.

TABLE 2

| | Diarboxylic acid or monocarboxylic acid | Viscosity of rheology modifier (mPa · s/20° C.) | | | Hydraulic slurry viscosity (mPa · s/ 20° C.) | Observation of reversed rolling by the standard test (I) |
|---|---|---|---|---|---|---|
| | Kind | X = 3 wt % | X = 5 wt % | X = 10 wt % | | |
| Present invention product | Malonic acid | More than 10000 | More than 10000 | 4600 | 4800 | Reversed rolling occurred |
| | Glutaric acid | 10000 | 2000 | 200 | 4800 | Reversed rolling occurred |
| | Pimelic acid | 500 | 150 | — | 4300 | Reversed rolling occurred |
| | Azelaic acid | 500 | — | — | 4100 | Reversed rolling occurred |
| | 1,4-Cyclohexane-dicarboxylic acid | 900 | 150 | — | 4200 | Reversed rolling occurred |
| | 1,2-Cyclohexane-dicarboxylic acid (tetrahydrophthalic acid) | 500 | — | — | 4600 | Reversed rolling occurred |
| | 4-Methylcyclohexane-1,2-dicarboxylic acid | 350 | — | — | 4500 | Reversed rolling occurred |
| | 2,4-diethylglutaric acid | 200 | 150 | — | 4800 | Reversed rolling occurred |
| | Norbornendicarboxylic acid | 2000 | 900 | — | 4300 | Reversed rolling occurred |
| | Maleic acid | 10000 | 10000 | 900 | 4800 | Reversed rolling occurred |
| | Itaconic acid | 8950 | 1100 | 150 | 4500 | Reversed rolling occurred |
| | Citraconic acid | 10000 | 1800 | 100 | 4700 | Reversed rolling occurred |
| | Cyclohexene-1,2-dicarboxylic acid | 750 | 150 | — | 4300 | Reversed rolling occurred |
| | 4-methylcyclohexene-1,2-dicarboxylic acid | 600 | — | — | 4500 | Reversed rolling occurred |
| Comparative product | Nonanoic acid | Emulsification · layer separation | Emulsification · layer separation | Emulsification · layer separation | — | — |
| | Hexanoic acid | Emulsification · layer separation | Emulsification · layer separation | Emulsification · layer separation | — | — |
| | None(blank) | More than 100000 | — | — | 5000 | Reversed rolling occurred |

Example 2

A liquid rheology modifier with the composition shown in Table 3 was prepared. The liquid rheology was regulated at 20° C. in a temperature-controlled water bath and measured for its viscosity with a Brookfield viscometer (Rotor No. 3, 12 rpm). The results are shown in Table 4. In all the rheology modifiers in Table 4, reversed rotating was observed by the standard test (I) method.

(1) Evaluation of Rheological Modification of Hydraulic Slurry 400 g normal portland cement was mixed with 400 g water by a hand mixer for 30 seconds, and then 16 g liquid rheology modifier in Table 3 was added thereto, and the mixture was further mixed under stirring for 60 seconds. The slurry mixed under stirring was observed with eyes, and the number of seconds in which the increase in viscosity reached saturation

TABLE 3

| | Kind | % by weight |
|---|---|---|
| Compound (A) | Hexadecyltrimethyl ammonium chloride/Octadecyltrimethyl ammonium chloride = 50/50 (weight ratio) | 14.5 |
| Compound (B) | Sodium p-toluensulfonate | 10.0 |
| Dicarboxylic acid (C) | Compound in Table 4 | X* |
| Monocarboxylic acid (E) | Compound in Table 4 | Y* |
| Others | Water | Balance |
| | Total | 100.0 |

*X, Y are amount (wt %) shown in Table 4.

TABLE 4

| No. | Dicarboxylic acid Kind | X (wt %) | Monocarboxylic acid Kind | Y (wt %) | Viscosity of rheology modifier (mPa·s/20° C.) |
|---|---|---|---|---|---|
| 2-1 | Glutaric acid | 10.0 | Hexanoic acid | 0.00 | 200 |
| 2-2 | Glutaric acid | 10.0 | Hexanoic acid | 0.50 | 230 |
| 2-3 | Glutaric acid | 10.0 | Hexanoic acid | 1.00 | 220 |
| 2-4 | Glutaric acid | 10.0 | Hexanoic acid | 2.00 | 195 |
| 2-5 | Glutaric acid | 10.0 | Decanoic acid | 0.00 | 200 |
| 2-6 | Glutaric acid | 10.0 | Decanoic acid | 0.25 | 350 |
| 2-7 | Glutaric acid | 10.0 | Decanoic acid | 0.50 | 410 |
| 2-8 | Glutaric acid | 10.0 | Decanoic acid | 0.75 | 475 |
| 2-9 | Glutaric acid | 10.0 | Decanoic acid | 1.00 | 530 |
| 2-10 | Glutaric acid | 10.0 | Decanoic acid | 1.50 | 550 |
| 2-11 | Glutaric acid | 10.0 | Decanoic acid | 2.00 | 450 |
| 2-12 | Glutaric acid | 10.0 | Oleic acid | 0.00 | 200 |
| 2-13 | Glutaric acid | 10.0 | Oleic acid | 0.50 | 390 |
| 2-14 | Glutaric acid | 10.0 | Oleic acid | 1.00 | 500 |
| 2-15 | Glutaric acid | 10.0 | Oleic acid | 1.50 | 400 |
| 2-16 | Azelaic acid | 3.0 | 2-ethylhexanoic acid | 0.00 | 500 |
| 2-17 | Azelaic acid | 3.0 | 2-ethylhexanoic acid | 1.00 | 250 |
| 2-18 | Diethyl glutaric acid | 3.0 | Nonanoic acid | 0.00 | 200 |
| 2-19 | Diethyl glutaric acid | 3.0 | Nonanoic acid | 1.00 | 165 |
| 2-20 | Pimelic acid | 5.0 | Heptanoic acid | 0.00 | 150 |
| 2-21 | Pimelic acid | 5.0 | Heptanoic acid | 1.00 | 350 |
| 2-22 | 1,4-cyclohexanedicarboxylic acid | 5.0 | Undecenoic acid | 0.00 | 600 |
| 2-23 | 1,4-cyclohexanedicarboxylic acid | 5.0 | Undecenoic acid | 1.00 | 205 |
| 2-24 | Methylcyclohexanedicarboxylic acid | 3.0 | Dedocanoic acid | 0.00 | 350 |
| 2-25 | Methylcyclohexanedicarboxylic acid | 3.0 | Dedocanoic acid | 1.00 | 295 |
| 2-26 | Methylcyclohexanedicarboxylic acid | 3.0 | Undecanoic acid | 0.00 | 600 |
| 2-27 | Methylcyclohexanedicarboxylic acid | 3.0 | Undecanoic acid | 1.00 | 235 |
| 2-28 | 1,2-cyclohexanedicarboxylic acid | 3.0 | Octanoic acid | 0.00 | 500 |
| 2-29 | 1,2-cyclohexanedicarboxylic acid | 3.0 | Octanoic acid | 1.00 | 200 |
| 2-30 | Cyclohexene-1,2-dicarboxylic acid | 5.0 | 3,6,5-trimethyl hexanoic acid | 0.00 | 150 |
| 2-31 | Cyclohexene-1,2-dicarboxylic acid | 5.0 | 3,6,5-trimethyl hexanoic acid | 1.00 | 150 |
| 2-32 | Itaconic acid | 10.0 | Hexanoic acid | 0.00 | 150 |
| 2-33 | Itaconic acid | 10.0 | Hexanoic acid | 1.00 | 175 |
| 2-34 | Citraconic acid | 10.0 | Heptanoic acid | 0.00 | 100 |
| 2-35 | Citraconic acid | 10.0 | Heptanoic acid | 1.00 | 215 |
| 2-36 | Glutaric acid<br>Azelaic acid | 10.0<br>1.0 | Decanoic acid | 0.00 | 120 |
| 2-37 | Glutaric acid<br>Azelaic acid | 10.0<br>1.0 | Decanoic acid | 1.00 | 225 |

| | Reversed rolling | | Test temperature (20° C.) | | Test temperature (10° C.) | |
|---|---|---|---|---|---|---|
| No. | Standard test (I) | Standard test (II) | Reaching time (second) | Hydraulic slurry viscosity (mPa·s/20° C.) | Reaching time (second) | Hydraulic slurry viscosity (mPa·s/10° C.) |
| 2-1 | occurred | occurred | 30 | 4500 | More than 60 | 3100 |
| 2-2 | occurred | occurred | 20 | 5200 | 45 | 3900 |
| 2-3 | occurred | occurred | 15 | 5600 | 30 | 4500 |
| 2-4 | Not occurred | occurred | 10 | 6000 | 5 | 6000 |
| 2-5 | occurred | occurred | 30 | 4500 | More than 60 | 3100 |
| 2-6 | occurred | occurred | 30 | 4800 | 50 | 3400 |
| 2-7 | occurred | occurred | 20 | 5200 | 30 | 3100 |

TABLE 4-continued

| | | | | | | |
|---|---|---|---|---|---|---|
| 2-8 | occurred | occurred | 10 | 5500 | 16 | 4700 |
| 2-9 | occurred | occurred | 7 | 6000 | 7 | 5000 |
| 2-10 | Not occurred | occurred | 7 | 5500 | 5 | 5000 |
| 2-11 | occurred | occurred | 7 | 5200 | 5 | 5000 |
| 2-12 | occurred | occurred | 30 | 4500 | More than 60 | 3100 |
| 2-13 | occurred | occurred | 20 | 4500 | 30 | 4800 |
| 2-14 | occurred | occurred | 18 | 4500 | 10 | 6500 |
| 2-15 | Not occurred | occurred | 6 | 600 | 10 | 950 |
| 2-16 | occurred | occurred | 30 | 4700 | More than 60 | 1300 |
| 2-17 | occurred | occurred | 10 | 2200 | 25 | 4500 |
| 2-18 | occurred | occurred | 30 | 4500 | More than 60 | 1000 |
| 2-19 | occurred | occurred | 10 | 8000 | 7 | 6000 |
| 2-20 | occurred | occurred | 30 | 4800 | More than 60 | 1600 |
| 2-21 | occurred | occurred | 10 | 5500 | 10 | 4800 |
| 2-22 | occurred | occurred | 30 | 4600 | More than 60 | 900 |
| 2-23 | occurred | occurred | 6 | 9000 | 9 | 4600 |
| 2-24 | occurred | occurred | 40 | 4700 | More than 60 | 1600 |
| 2-25 | occurred | occurred | 10 | 6200 | 40 | 3000 |
| 2-26 | occurred | occurred | 30 | 4500 | More than 60 | 1500 |
| 2-27 | occurred | occurred | 10 | 6500 | 25 | 2000 |
| 2-28 | occurred | occurred | 25 | 5200 | 60 | 1600 |
| 2-29 | occurred | occurred | 12 | 6500 | 20 | 5500 |
| 2-30 | occurred | occurred | 25 | 4300 | More than 60 | 4000 |
| 2-31 | occurred | occurred | 10 | 5000 | 15 | 4700 |
| 2-32 | occurred | occurred | 15 | 5800 | 40 | 3000 |
| 2-33 | occurred | occurred | 6 | 6500 | 7 | 6000 |
| 2-34 | occurred | occurred | 12 | 6500 | 30 | 4000 |
| 2-35 | occurred | occurred | 7 | 6000 | 5 | 6000 |
| 2-36 | occurred | occurred | 10 | 6200 | 25 | 3900 |
| 2-37 | occurred | occurred | 8 | 6200 | 7 | 5000 |

Example 3

A liquid rheology modifier was prepared with the composition shown in Table 5 and evaluated in the same manner as in Example 2. The results are shown in Table 6. In the rheology modifier in Table 6, a reversed rotating was observed by the standard tests (I) and (II) method.

TABLE 5

| | Kind | % by weight |
|---|---|---|
| Compound (A) | Hexadecyltrimethyl ammonium chloride/octadecyltrimethyl ammonium chloride = 50/50 (ratio by weight) | 14.5 |
| Compound (B) | Sodium m-xylenesulfonate | 9.1 |
| Dicarboxylic acid (C) | Compound in Table 6 | X* |
| Monocarboxylic acid (E) | Compound in Table 6 | Y* |
| Other | Water | Balance |
| | Total | 100.0 |

*X, Y are amounts (wt %) shown in Table 6.

TABLE 6

| | Dicarboxylic acid | | Monocarboxylic acid | | Viscosity of rheology modifier (20° C.) | Test temperature (20° C.) | | Test temperature (10° C.) | |
|---|---|---|---|---|---|---|---|---|---|
| | | | | | | Reaching time (second) | Hydraulic slurry viscosity (20° C.) | Reaching time (second) | Hydraulic slurry viscosity (10° C.) |
| No. | Kind | X (weight-%) | Kind | Y (weight-%) | | | | | |
| 3-1 | Glutaric acid | 10.0 | Decanoic acid | 1.00 | 470 mPa·s | 10 | 9500 mPa·s | 5 | 4800 mPa·s |

Example 4

A liquid rheology modifier was prepared with the composition shown in Table 7 and evaluated in the same manner as in Example 2. The results are shown in Table 8. In the rheology modifier in Table 8, reversed rotating was observed by the standard test (I) and (II) method.

TABLE 7

| | Kind | % by weight |
|---|---|---|
| Compound (A) | Hexadecyltrimethyl ammonium chloride/tetradecyltrimethyl ammonium chloride = 87/13 (weight ratio) | 11.2 |
| Compound (B) | sodium p-toluensulfonate | 10.0 |
| Dicarboxylic acid (C) | Compound in Table 8 | X* |
| Monocarboxylic acid (E) | Compound in Table 8 | Y* |
| Other | Water | Balance |
| | Total | 100.0 |

*X, Y are amounts (wt %) shown in Table 8.

TABLE 8

| | Dicarboxylic acid | | Monocarboxylic acid | | Viscosity of rheology modifier (20° C.) | Test temperature (20° C.) | | Test temperature (10° C.) | |
|---|---|---|---|---|---|---|---|---|---|
| | | | | | | Reaching time (second) | Viscosity of hydraulic slurry (20° C.) | Reaching time (second) | Viscosity of hydraulic slurry (10° C.) |
| No. | Kind | X (wt %) | Kind | Y (wt %) | | | | | |
| 4-1 | Glutaric acid | 10.0 | Decanoic acid | 1.00 | 215 | 7 | 6000 | 5 | 9000 |

Example 5

A liquid rheology modifier was prepared with the composition shown in Table 9 and evaluated in the same manner as in Example 2. Results are shown in Table 10.

TABLE 9

| | Kind | % by weight |
|---|---|---|
| Compound (A) | Hexadecyltrimethyl ammonium chloride/octadecyltrimethyl ammonium chloride = 50/50 (weight ratio) | 14.5 |
| Compound (B) | Sodium p-toluensulfonate | 10.0 |
| Dicarboxylic acid (C) | Compound in Table 10 | X* |
| Monocarboxylic acid (E) | Compound in Table 10 | Y* |
| Cationic polymer | Poly (methacroyloxyethyl dimethylethyl ammonium ethyl sulfate) (weight-average molecular weight is 120000.) | 5.0 |
| Other | Water | Balance |
| | Total | 100.0 |

*X, Y are amounts (wt %) shown in Table 10.

TABLE 10

| | | | | | Viscosity of rheology modifier (20° C.) | Reversed rolling | | Test temperature (20° C.) | | Test temperature (10° C.) | |
|---|---|---|---|---|---|---|---|---|---|---|---|
| | Dicarboxylic acid | | Monocarboxylic acid | | | Standard test (I) | Standard test (II) | Hydraulic | | Hydraulic | |
| No. | Kind | X (wt %) | Kind | Y (wt %) | | | | Reaching time (second) | slurry viscosity (20° C.) | Reaching time (second) | slurry viscosity (10° C.) |
| 5-1 | Glutaric acid | 10.0 | Decanoic acid | 0.00 | 130 mPa·s | occurred | occurred | 7 | 6300 mPa·s | 30 | 4500 mPa·s |
| | Azelaic acid | 1.0 | | | | | | | | | |
| 5-2 | Glutaric acid | 10.0 | Decanoic acid | 1.00 | 235 mPa·s | occurred | occurred | 5 | 6300 mPa·s | 7 | 4500 mPa·s |
| | Azelaic acid | 1.0 | | | | | | | | | |

The invention claimed is:

1. A rheology modifier that is liquid comprising a first water-soluble low-molecular-weight compound (referred to hereinafter as compound (A)), a second water-soluble low-molecular-weight compound different from the compound (A) (referred to hereinafter as compound (B)), and a dicarboxylic acid (C) selected from the group consisting of 2,4-diethylglutaric acid, pimelic acid, azelaic acid, 4-methylcyclohexane-1,2-dicarboxylic acid, 4-methylcyclohexene-1,2-dicarboxylic acid, 1,4-cyclohexanedicarboxylic acid, 1,2-cyclohexanedicarboxylic acid, norbornenedicarboxylic acid, itaconic acid, and cyclohexene-1,2-dicarboxylic acid, wherein the compound (A) is selected from cationic surfactants and the compound (B) is selected from anionic aromatic compounds; and wherein the content of the dicarboxylic acid (C) is 3 to 10% by weight in the rheology modifier.

2. The liquid rheology modifier according to claim 1, wherein the content of the dicarboxylic acid (C) is 5 to 10% by weight in the liquid rheology modifier.

3. The liquid rheology modifier according to claim 1 or 2, wherein a reversed rotating of air bubbles is observed in a solution when stirring is stopped in the following standard test (I):

Standard test (I): 90 mL of 0.1 N aqueous potassium hydroxide solution and 10 ml of the rheology modifier are added to a 200-mL beaker and stirred at 4 rotation/second with a glass rod of 6 mm in diameter for 180 seconds.

4. The liquid rheology modifier according to claim 1 or 2, wherein a reversed rotating of air bubbles is observed in a solution when stirring is stopped in the following standard test (II):

Standard test (II): 95 mL of 0.1 N aqueous potassium hydroxide solution and 5 ml of the rheology modifier are added to a 200-mL beaker and stirred at 4 rotation/second with a glass rod of 6 mm in diameter for 180 seconds.

5. The liquid rheology modifier according to claim 1 or 2, which further comprises a monocarboxylic acid (E).

6. A rheology modifier that is liquid comprising a first water-soluble low-molecular-weight compound (referred to hereinafter as compound (A)), a second water-soluble low-molecular-weight compound different from the compound (A) (referred to hereinafter as compound (B)), and a hydrophilic group- and hydrophobic group-containing amphipathic compound (D) being different from the compounds (A) and (B), wherein:

the viscosity of the modifier at 20° C. is 5000 mPa·s or less,
wherein the compound (A) is selected from cationic surfactants and the compound (B) is selected from anionic aromatic compounds,
a reversed rotating of air bubbles being observed in a solution when stirring is stopped in the following standard test (I):
Standard test (I): 90 mL of 0.1 N aqueous potassium hydroxide solution and 10 ml of the rheology modifier are added to a 200-mL beaker and stirred at 4 rotation/second with a glass rod of 6 mm in diameter for 180 seconds;
wherein the compound (D) is carboxylic acid compounds selected from the group consisting of 2,4-diethylglutaric acid, pimelic acid, azelaic acid, 4-methylcyclohexane-1,2-dicarboxylic acid, 4-methylcyclohexene-1,2-dicarboxylic acid, 1,4-cyclohexanedicarboxylic acid, 1,2-cyclohexanedicarboxylic acid, norbornenedicarboxylic acid, itaconic acid, cyclohexene-1,2-dicarboxylic acid, hexane-1,3,6-tricarboxylic acid, dicarboxylic acid ester, and tetracarboxylic acid; and
wherein the content of the compound (D) is 3 to 10% by weight in the rheology modifier.

7. A rheology modifier that is liquid comprising a first water-soluble low-molecular-weight compound (referred to hereinafter as compound (A)), a second water-soluble low-molecular-weight compound different from the compound (A) (referred to hereinafter as compound (B)), and a dicarboxylic acid (C) selected from the group consisting of 2,4-diethylglutaric acid, pimelic acid, azelaic acid, 4-methylcyclohexane-1,2-dicarboxylic acid, 4-methylcyclohexene-1,2-dicarboxylic acid, 1,4-cyclohexanedicarboxylic acid, 1,2-cyclohexanedicarboxylic acid, norbornenedicarboxylic acid, itaconic acid, and cyclohexene-1,2-dicarboxylic acid, wherein the compound (A) is selected from cationic surfactants and the compound (B) is selected from anionic aromatic compounds,
the viscosity of the liquid rheology modifier at 20° C. being 5000 mPa·s or less,
wherein, just after 16 g of the liquid rheology modifier is added to and mixed with a slurry prepared from 400 g of normal portland cement and 400 g water, the viscosity of the slurry being 3000 mPa·s or more at 20° C.; and
wherein the content of the dicarboxylic acid (C) is 3 to 10% by weight in the rheology modifier.

8. The liquid rheology modifier according to claim 7, in which a reversed rotating of air bubbles is observed in a solution when stirring is stopped in the following standard test (II):

Standard test (II): 95 mL of 0.1 N aqueous potassium hydroxide solution and 5 ml of the rheology modifier are added to a 200-mL beaker and stirred at 4 rotation/second with a glass rod of 6 mm in diameter for 180 seconds.

9. The liquid rheology modifier according to claim 7 or 8, which further comprises a monocarboxylic acid (E).

10. A slurry comprising powder, water and the liquid rheology modifier according to any of claims 1, 6 and 7.

11. A slurry comprising a hydraulic powder, water and the liquid rheology modifier according to any of claims 1, 6 and 7.

* * * * *